(12) United States Patent  
Iura et al.

(10) Patent No.: US 8,810,840 B2  
(45) Date of Patent: Aug. 19, 2014

(54) IMAGE FORMING SYSTEM, OUTPUT MANAGEMENT METHOD, AND PROGRAM PRODUCT, CONFIGURED TO DETERMINE TYPE OF PDL IN OUTPUT DATA

(75) Inventors: Saori Iura, Kanagawa (JP); Isamu Mitsuke, Kanagawa (JP); Yuichi Yoshida, Kanagawa (JP); Takahiro Hirakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 13/538,258

(22) Filed: Jun. 29, 2012

(65) Prior Publication Data  
US 2013/0010319 A1 Jan. 10, 2013

(30) Foreign Application Priority Data  
Jul. 8, 2011 (JP) .................................. 2011-151704

(51) Int. Cl.  
*G06F 3/12* (2006.01)

(52) U.S. Cl.  
USPC ....... 358/1.15; 358/1.13; 358/1.14; 358/1.16; 358/1.9

(58) Field of Classification Search  
None  
See application file for complete search history.

(56) References Cited

U.S. PATENT DOCUMENTS

| | | | | |
|---|---|---|---|---|
| 2003/0197892 A1* | 10/2003 | Fukuoh | ...................... | 358/1.15 |
| 2010/0073707 A1* | 3/2010 | Ferlitsch | ...................... | 358/1.15 |
| 2010/0134818 A1* | 6/2010 | Minamizono et al. | ........ | 358/1.13 |
| 2010/0165388 A1* | 7/2010 | Ikeura | ...................... | 358/1.15 |
| 2012/0127498 A1* | 5/2012 | Lombardo et al. | ........... | 358/1.13 |

FOREIGN PATENT DOCUMENTS

JP 10-278386 10/1998

* cited by examiner

*Primary Examiner* — Miya J Cato  
(74) *Attorney, Agent, or Firm* — Cooper & Dunham LLP

(57) ABSTRACT

An image forming system includes an image forming apparatus and an output management server. The output management server includes a receiving unit to receive an output data, an analysis unit to analyze the output data and determine a PDL required for outputting the output data, a management unit to determine whether the PDL is available, and a transmitting unit to transmit the output data and an executable file of the PDL to the designated image forming apparatus, when the PDL is determined as available. The image forming apparatus includes a receiving unit to receive the output data and the executable file of the PDL, a control unit to activate the executable file of the PDL and develop the output data, an output unit to output the output data, and a deleting unit to delete the executable file of the PDL, after the outputting of the output data is completed.

8 Claims, 16 Drawing Sheets

FIG.3

```
%-12345X@PJL JOB NAME = "Microsoft Word - j9.doc"
@PJL COMMENT NOTIFICATION = "0x00"
@PJL SET AUTHENTICATIONUSERNAME = ""
@PJL SET AUTHENTICATIONPASSWORD = ""
@PJL SET JOBNAME = "Microsoft Word - j9.doc"
...
@PJL ENTER LANGUAGE = "PCL"  ← TYPE
@PJL LANGUAGE VERSION = "1.00"  ← PDL VERSION
@PJL MACHINE NAME = "A"  ← MODEL
@PJL FONT VERSION = "1.00"  ← PDL VERSION
...
```

FIG.4

OUTPUT DESTINATION MANAGEMENT TABLE

| MODEL NAME | VERSION INFORMATION | IP ADDRESS |
|---|---|---|
| AAA | 1.50 | 133.139.12.11 |
| BBB | 1.10 | 133.139.12.14 |
| CCC | 5.20 | 133.139.12.27 |
| ... | ... | ... |

FIG.5

LENDING INFORMATION MANAGEMENT TABLE

| MODEL NAME | IP ADDRESS | PDL LENDING SITUATION | STATUS |
|---|---|---|---|
| AAA | 133.139.12.11 | PCL (MODEL NAME: AAA, VERSION: 1.50, Font 1.00) | UNDER PRINTING |
| BBB | 133.139.12.14 | PS (MODEL NAME: BBB, VERSION: 1.10) | PRINTING COMPLETED |
| CCC | 133.139.12.27 | – | – |
| ... | ... | ... | ... |

FIG.15

```
UTILIZATION LOG

MODEL    VERSION                       HOLDING   USAGE
TYPE     NAME     INFORMATION    FONT           NUMBER    NUMBER
PCL      AAA      1.50           pcl1.00        10        5
PCL      BBB      1.10           pcl1.00        3         2
XPS      AAA      1.00           xps1.01        4         4
...
```

IMAGE FORMING SYSTEM, OUTPUT MANAGEMENT METHOD, AND PROGRAM PRODUCT, CONFIGURED TO DETERMINE TYPE OF PDL IN OUTPUT DATA

CROSS-REFERENCE TO RELATED APPLICATIONS

The present application claims priority to and incorporates by reference the entire contents of Japanese Patent Application No. 2011-151704 filed in Japan on Jul. 8, 2011.

BACKGROUND OF THE INVENTION

1. Field of the Invention

The present invention relates to an image forming system, an output management method, and a program product allowing a user to send an output request to an image forming apparatus from a PC (Personal Computer) via a network.

2. Description of the Related Art

Conventionally, print data sent to an image forming apparatus from a user's PC (Personal Computer) or the like is interpreted and developed into an image by using PDL (Page Description Language), and then printed by using a printer engine. However, the print data described in a PDL incompatible with the image forming apparatus cannot be interpreted at the image forming apparatus and thereby cannot be printed. In order to address this inconvenience, there is known a technology in which a plurality of PDLs are loaded onto the image forming apparatus and the plurality of PDLs are switched for print data to be printed.

On the other hand, there is known a technology for printing print data via a print server from a PC or the like. In this technology, a user sends the print data to the print server. The print server determines a PDL compatible with the print data and then sends the print data to an image forming apparatus compatible with this PDL loaded thereto. In this technology, the user can send a print request without caring which PDL is compatible with the image forming apparatus.

For example, there is disclosed a technology of printer system for assigning print data having PDL information requested by a user to an appropriate printer device (Japanese Patent Application Laid-open No. H10-278386).

Specifically, a user sends a print data via network to a print server knowing which PDL is loaded onto an image forming apparatus. Once received the print data, the print server determines an image forming apparatus which is not operated and is compatible with the PDL capable of printing the print data (i.e. the PDL is loaded onto the image forming apparatus), and then sends the print data to the determined image forming apparatus. The print server sends to the user the information of the image forming apparatus to which the print data is sent.

Also, the print system according to Japanese Patent Application Laid-open No. H10-278386 can manage each image forming apparatus including PDL information which is newly set to the print server, in order for the image forming apparatus to inform the print server a fact that the PDL is changed, when the user sets a new PDL information.

In the print system according to Japanese Patent Application Laid-open No. H10-278386, an amount of memory usage of the image forming apparatus increases, since a plurality of PDLs are loaded onto the image forming apparatus. Furthermore, since the plurality of PDLs are loaded onto each image forming apparatus, the required time and effort to update PDLs is quite long and large. Furthermore, when the printing is performed by using the print server disclosed in Japanese Patent Application Laid-open No. H10-278386, the user cannot designate the image information apparatus to be used for the printing.

SUMMARY OF THE INVENTION

It is an object of the present invention to at least partially solve the problems in the conventional technology.

An image forming system includes an image forming apparatus and an output management server connected with the image forming apparatus via a network. The output management server includes a first receiving unit configured to receive an output data, an analysis unit configured to analyze the output data and determine a type of PDL (Page Description Language) required for outputting the output data, a management unit configured to determine whether the type of PDL required for outputting the output data is available, and a first transmitting unit configured to transmit the output data and an executable file of the type of PDL to the image forming apparatus designated by a user, when the management unit determines that the type of PDL required for outputting the output data is available. The image forming apparatus includes a second receiving unit configured to receive the output data and the executable file of the type of PDL, a control unit configured to activate the executable file of the type of PDL received by the second receiving unit and develop the output data, an output unit configured to output the output data, and a deleting unit configured to delete the executable file of the type of PDL, after the outputting of the output data is completed.

An output management method is conducted by an image forming system composed of an image forming apparatus and an output server connected with the image forming apparatus via a network. The method includes receiving an output data, analyzing the output data and determining a type of PDL (Page Description Language) required for outputting the output data, determining whether the type of PDL required for outputting the output data is available, and transmitting the output data and an executable file of the type of PDL to the image forming apparatus designated by a user, when it is determined that the type of PDL required for outputting the output data is available.

A computer program product is embodied as a non-transitory computer-readable medium having computer-readable program codes embedded therein for conducting an output management by an image forming system composed of an image forming apparatus and an output server connected with the image forming apparatus via a network. The program codes when executed causes a computer to execute receiving an output data, analyzing the output data and determining a type of PDL (Page Description Language) required for outputting the output data, determining whether the type of PDL required for outputting the output data is available, and transmitting the output data and an executable file of the type of PDL to the image forming apparatus designated by a user, when it is determined that the type of PDL required for outputting the output data is available.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating print data;

FIG. 4 is a diagram illustrating one example of an output determination management table;

FIG. 5 is a diagram illustrating one example of a lending information management table;

FIG. 15 is a diagram illustrating one example of a utilization log;

DETAILED DESCRIPTION OF THE PREFERRED EMBODIMENTS

Hereinafter, referring to the accompanying drawings, preferred embodiments of an image forming system, an output management method and a program product according to this invention will be described in detail.

First Embodiment

Figure 1:
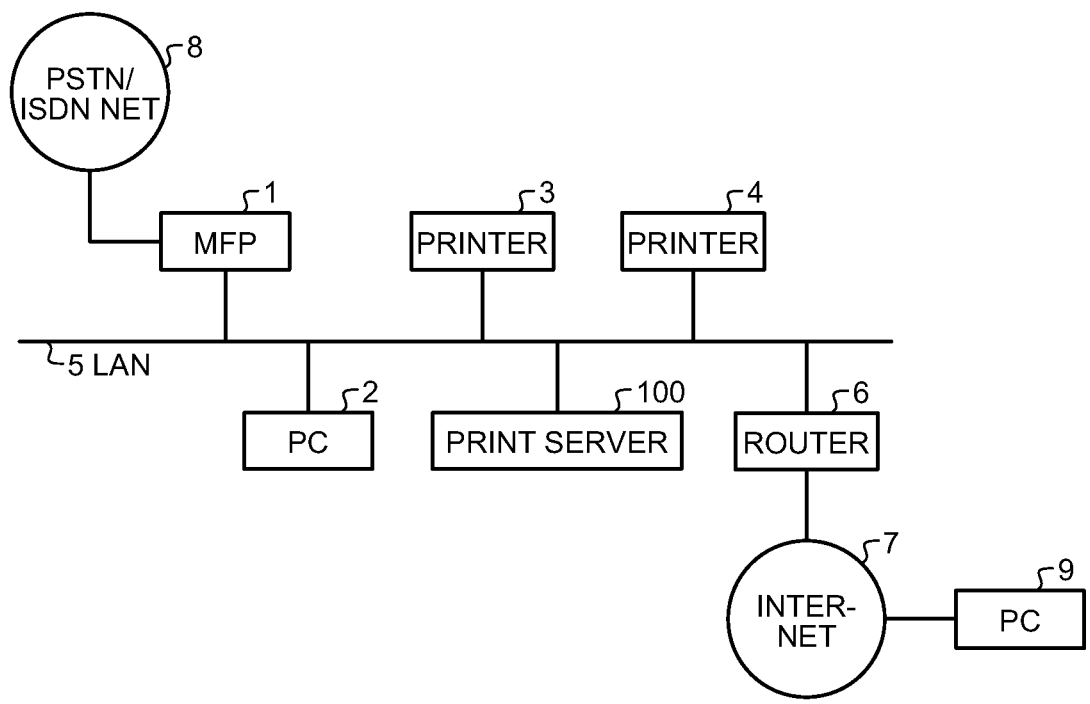
FIG. 1 a diagram illustrating a network configuration according to a first embodiment.

FIG. 1 is a diagram illustrating a network configuration according to a first embodiment. In an image forming system of the first embodiment, an MFP (MultiFunction Peripheral) 1, a PC 2, printers 3, 4, a print server 100, and a router 6 are connected via a LAN (Local Area Network) 5. The LAN 5 is connected to the Internet 7 via the router 6, and the respective apparatuses are connected to a PC 9 via the Internet 7. The MFP 1 is connected to a PSTN (Public Switched Telephone Networks)/ISDN (Integrated Services Digital Network) net 8. The respective apparatuses communicate with the other apparatuses by a TCP/IP (Transmission Control Protocol/Internet Protocol) protocol.

In the image forming system of the first embodiment, the user designates the image forming apparatus to be used to print the print data, and transmits or sends the print data to the print server 100 from the PC 2. The print server 100 analyzes the print data to determine a type of PDL required to print the print data, and transmits or sends the print data and a PDL executable file to the designated image forming apparatus. The designated image forming apparatus prints the print data.

In FIG. 1, there is illustrated as an example of the image forming apparatus, the MFP 1 having at least two functions from among a copy function, a printer function, a scanner function and a facsimile function, as well as the printers 3, 4. Without limiting to this example, this embodiment is applicable to any image forming apparatus such as a copy machine, a scanning machine, a facsimile machine, and the like. Hereinafter, the explanation will be made on the image forming apparatus in general.

Figure 2:
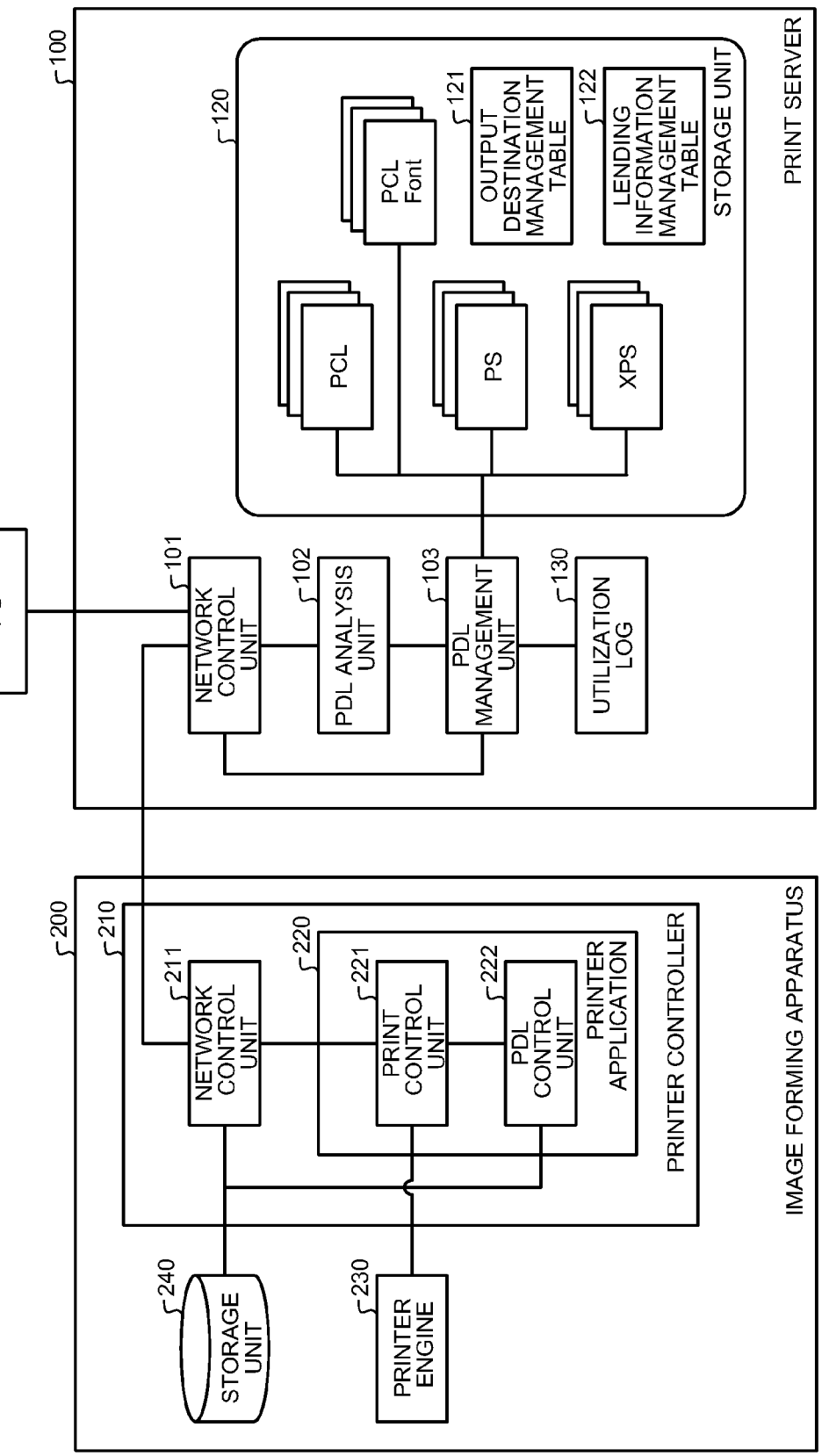
FIG. 2 is a diagram illustrating a configuration of an image forming system according to the first embodiment.

FIG. 2 illustrates a configuration of an image forming system according to the first embodiment. As illustrated in FIG. 2, in the image forming system, the PC 2, the print server 100, and the image forming apparatus 200 are connected via the network.

The PC 2 is for designating by the user the image forming apparatus to be used to print the print data, and for sending the print data to the print server 100.

FIG. 3 is a figure for explaining the print data. The print data is composed of PJL (Printer Job Language) information and a PDL. The PJL information is a printer command language for controlling the image forming apparatus such as a printer, and is used mainly for setting the printing condition. As shown in FIG. 3, the print data includes a type information of PJL, a version information of PJL, a model information of image forming apparatus, a version information of font.

Next, the print server 100 will be explained. The print server 100 receives the print data, determines the type of PDL compatible with the print data, and sends (transmits) the print data and the PDL executable file to the designated image forming apparatus. The print server 100 is provided mainly with a storage unit 120, a utilization log 130, a network control unit 101, a PDL analysis unit 102, and a PDL management unit 103.

The storage unit 120, which is for storing the Font and the PDL executable file to be used for the printing, is a recording medium such as HDD (Hard Disk Drive), memory and the like. For example, the storage unit 120 stores therein a plurality types of PDL executable files such as PCL (Printer Control Language), PS (PostScript), XPS (XML Paper Specification), and the like.

The storage unit 120 stores therein an output destination management table 121 to manage the information of the output destination of the print data. In the output destination management table 121, an unique IP address (as the unique identification information) of the image forming apparatus such as the MFP 1 or the printers 3, 4, a model name of machine as the machine information about the image information apparatus, a version information and the like are associated with each other. FIG. 4 illustrates an example of the output destination management table. As illustrated in FIG. 4, in the output destination management table 121, the IP address "133.139.12.11", "133.139.12.14" and the like, the model names "AAA", "BBB" and the like, and the version information "1.50", "1.10" and the like are associated with one another.

Moreover, the storage unit 120 stores a lending information management table 122 to manage information of the PDL, in use and the like. In the lending information management table 122, the unique IP address of the image forming apparatus, the model name of the image forming apparatus, a lending situation of the PDL, and a status of the image forming apparatus are associated with one another. FIG. 5 illustrates an example of the lending information management table. As illustrated in FIG. 5, in the lending information management table 122, the IP addresses "133.139.12.11", "133.139.12.14" and the like, the model names of the imaging forming apparatuses "AAA", "BBB" and the like, the lending situations of the PDL "PCL (model name: AAA, version: 1.50, Font 1.00)", "PS (model name: BBB, version: 1.10) and the like, and the statuses of the image forming apparatuses, "under printing", "printing completed" and the like are associated with one another.

The utilization log 130 is a log of a utilization situation of the PDL and is updated by the PDL management unit 103 described later.

The network control unit 101 receives from the PC 2 the designation of the image forming apparatus to be used for the printing as well as the print data desired by the user to be printed. Furthermore, the network control unit 101 acquires the PDL executable file required for the printing from the storage unit 120, and sends the print data and the PDL executable file to the image forming apparatus designated by the user, when the PDL management unit 103 determines that the PDL required for the printing is available. At this time, the font required for the printing is also sent. Furthermore, the network control unit 101 receives from the image forming apparatus 200 a print completion notice which indicates a fact that the printing is completed. Furthermore, the network control unit 101 receives from the image forming apparatus 200 a PDL deletion notice which indicates a fact that the PDL executable file is deleted.

The PDL analysis unit 102 analyzes the received print data, and determines the type of the PDL matching the model and the version of the image forming apparatus designated by the user with reference to the print data and the output destination management table 121 which is stored in the storage unit 120. That is, the type of the PDL, the PDL version, the model of the image forming apparatus, and the font version in the print data are compared with the model names of the image forming apparatuses, the version information and the like in the output destination management table 121 to determine the PDL enabling the received print data to be printed by the designated image forming apparatus.

The PDL management unit 103 manages the PDL executable files stored in the storage unit 120, and determines whether the PDL determined by the PDL analysis unit 102 is available with reference to the PDL executable files stored in the storage unit 120. If determined that the PDL is available, the PDL management unit 103 lends the PDL executable file to the image forming apparatus 200 from the network control unit 101. Furthermore, the PDL management unit 103 updates the lending information management table 122, when received the PDL deletion notice which indicates a fact that the PDL executable file is deleted from the image forming apparatus 200.

Next, the image forming apparatus 200 will be explained. The image forming apparatus 200, which is for receiving the print data and the PDL executable file and for printing the print data, is provided mainly with a storage unit 240, a printer engine 230, and a printer controller 210. The printer controller 210 is provided with a network control unit 211 and a printer application 220. The printer application 220 is provided with a print control unit 221 and a PDL control unit 222.

The storage unit 240, which is for storing the print data and the PDL executable file which is received by the network control unit 211, is a recording medium such as an HDD, a memory and the like.

The printer engine 230 is for printing the print data on recording paper or the like.

The network control unit 211 is for receiving the print data and the PDL executable file from the print server 100, and for saving the same in the storage unit 240. At this time, the font required for the printing is also received and saved. Moreover, when the printing is completed, the network control unit 211 sends to the print server 100 the print completion notice which indicates a fact that the printing is completed. Also, when the PDL control unit 222 deleted the PDL executable file, the network control unit 211 sends to the print server 100 the PDL deletion notice which indicates a fact that the PDL executable file is deleted.

The print control unit 221 is for sending to the printer engine 230 an image developed from the print data, in order to perform the printing by the printer engine 230. When the printer engine 230 completes the printing of the print data, the print control unit 221 sends the print completion notice to the print server 100 via the network control unit 211, and also requests the PDL control unit 222 to delete the PDL executable file. Also, the print control unit 221 sends the PDL deletion notice to the print server 100 via the network control unit 211.

The PDL control unit 222 is for activating the PDL executable file stored in the storage unit 240 to develop the print data. Moreover, after the printing of the print data is completed, the PDL control unit 222 deletes the PDL executable file utilized in the printing by receiving the request of the print control unit 221.

Figure 6:
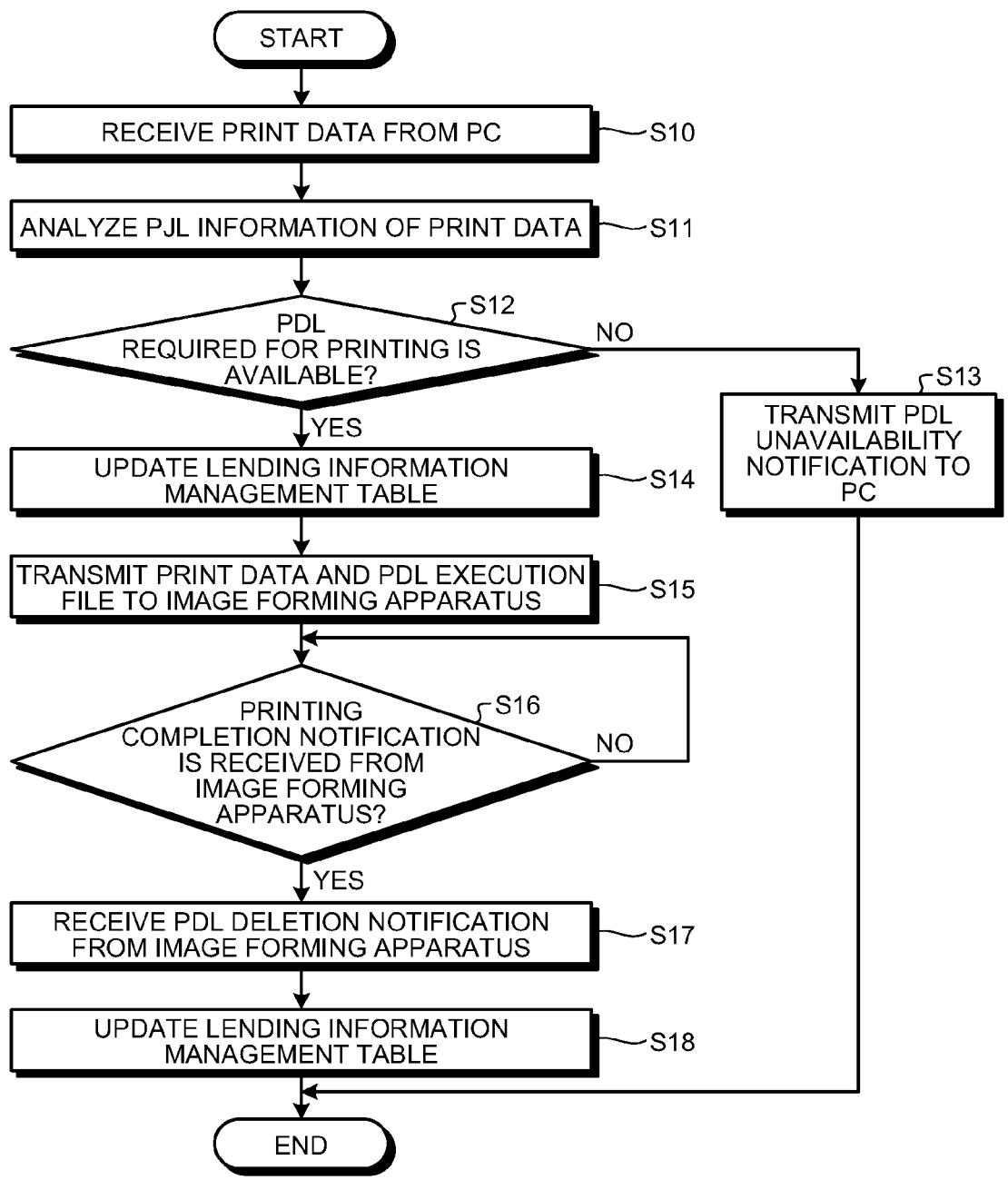
FIG. 6 is a flowchart illustrating a flow of printing processing in a print server according to the first embodiment.

Next, the printing processing of the print data in the print server 100 configured as described above will be explained. FIG. 6 illustrates a flow of the printing processing in the print server according to the first embodiment.

First, the network control unit 101 receives the print data transmitted from the PC 2 by the user (step S10). The PDL analysis unit 102 analyzes the PJL information included in the received print data (step S11), and determines the type of the PDL required for the printing.

Next, the PDL management unit 103 determines whether the PDL determined by the PDL analysis unit 102 is available (step S12). If the PDL is not available (step S12: No), the network control unit 101 sends to the PC 2 a PDL unavailable notice which indicates a fact that the PDL is unavailable (step S13).

On the other hand, if the PDL is available (step S12: Yes), the PDL management unit 103 updates the lending information management table 122 (step S14), and the network control unit 101 acquires the PDL executable file required for the printing from the storage unit 120, and sends the print data and the PDL executable file required for the printing to the image forming apparatus 200 designated by the user (step S15).

The network control unit 101 determines whether it receives from the image forming apparatus the print completion notice which indicates a fact that the printing is completed (step S16). If the notice is not received, the network control unit 101 stands by until receiving the notice (step S16: No).

On the other hand, if the print completion notice is received (step S16: Yes), the network control unit 101 receives the PDL deletion notice from the image forming apparatus 200 (step S17), and the PDL management unit 103 updates the lending information management table 122 (step S18).

Figure 7:
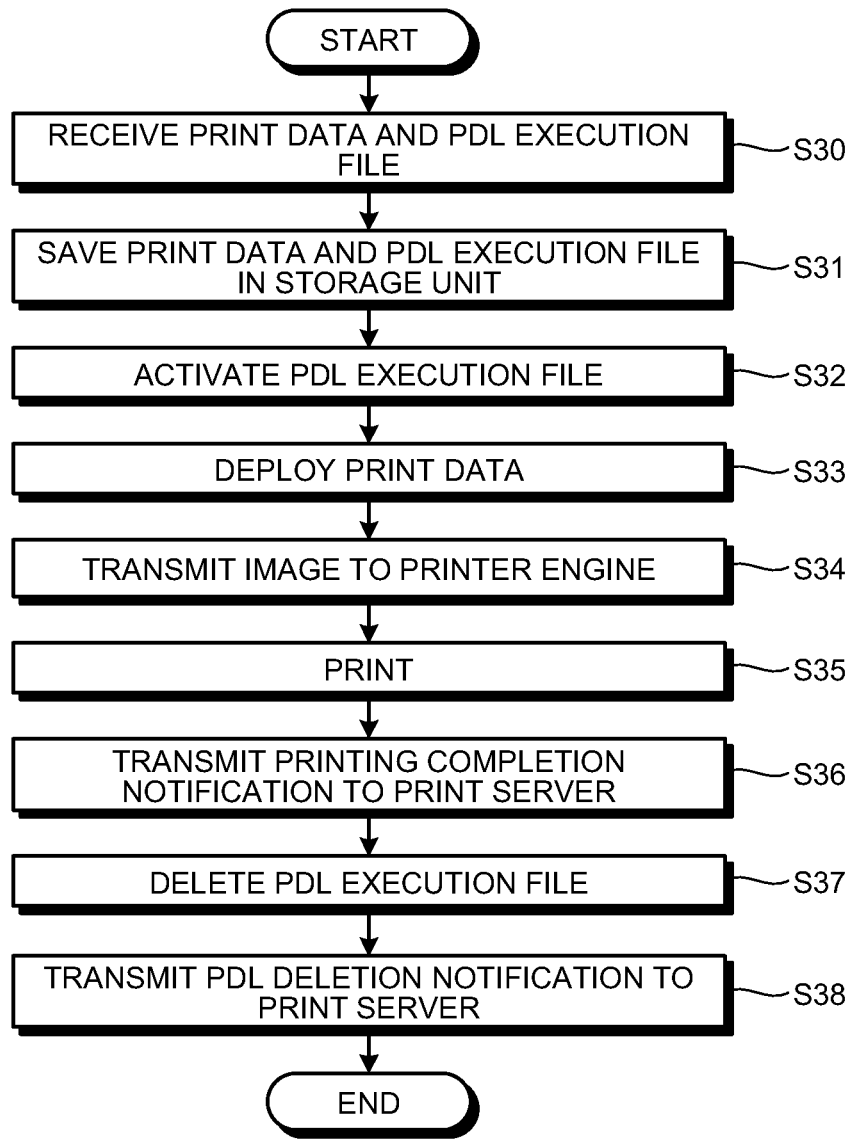
FIG. 7 is a flowchart illustrating a flow of printing processing in an image forming apparatus according to the first embodiment.

Next, the printing processing of the print data in the image forming apparatus 200 will be explained. FIG. 7 illustrates a flow of the printing processing in the image forming apparatus according to the first embodiment.

First, upon receiving the print data and the PDL executable file from the print server 100 (step S30), the network control unit 211 saves the received print data and the PDL executable file in the storage unit 240 (step S31).

The PDL control unit 222 activates the PDL executable file (step S32) to develop the print data (step S33). The print control unit 221 sends the image developed from the print data to the printer engine 230 (step S34), and the printer engine 230 performs the printing of the print data (step S35).

When the printing is completed, the network control unit 211 sends the print completion notice to the print server 100 (step S36). The PDL control unit 222 deletes the PDL executable file utilized in the printing (step S37), and the network control unit 211 sends the PDL deletion notice to the print server 100 (step S38).

In this manner, in the image forming system of the first embodiment, the print server analyzes the print data received from the user to determine the type of the PDL required for the printing, and sends the print data and the PDL executable file to the designated image forming apparatus, so that the image forming apparatus performs the printing of the print data. Since the image forming apparatus does not need to store the plurality of types of PDL executable files, the memory usage of the image forming apparatus can be reduced and the time and effort to update the PDLs in the image forming apparatus can be saved, and the user can designate any desired image forming apparatus to be used for the printing.

Second Embodiment

In the image forming system of the first embodiment, when the PDL required for the printing is available in the print server, the print server transmits the print data and the PDL executable file to the image forming apparatus, and the print data is printed at the image forming apparatus. In contrast, in an image forming system of the present embodiment, even when the PDL required for the printing is determined as available in the print server, if the relevant PDL is mounted on the image forming apparatus, the print data is transmitted to the image forming apparatus to perform the printing, utilizing the mounted PDL.

Figure 8:
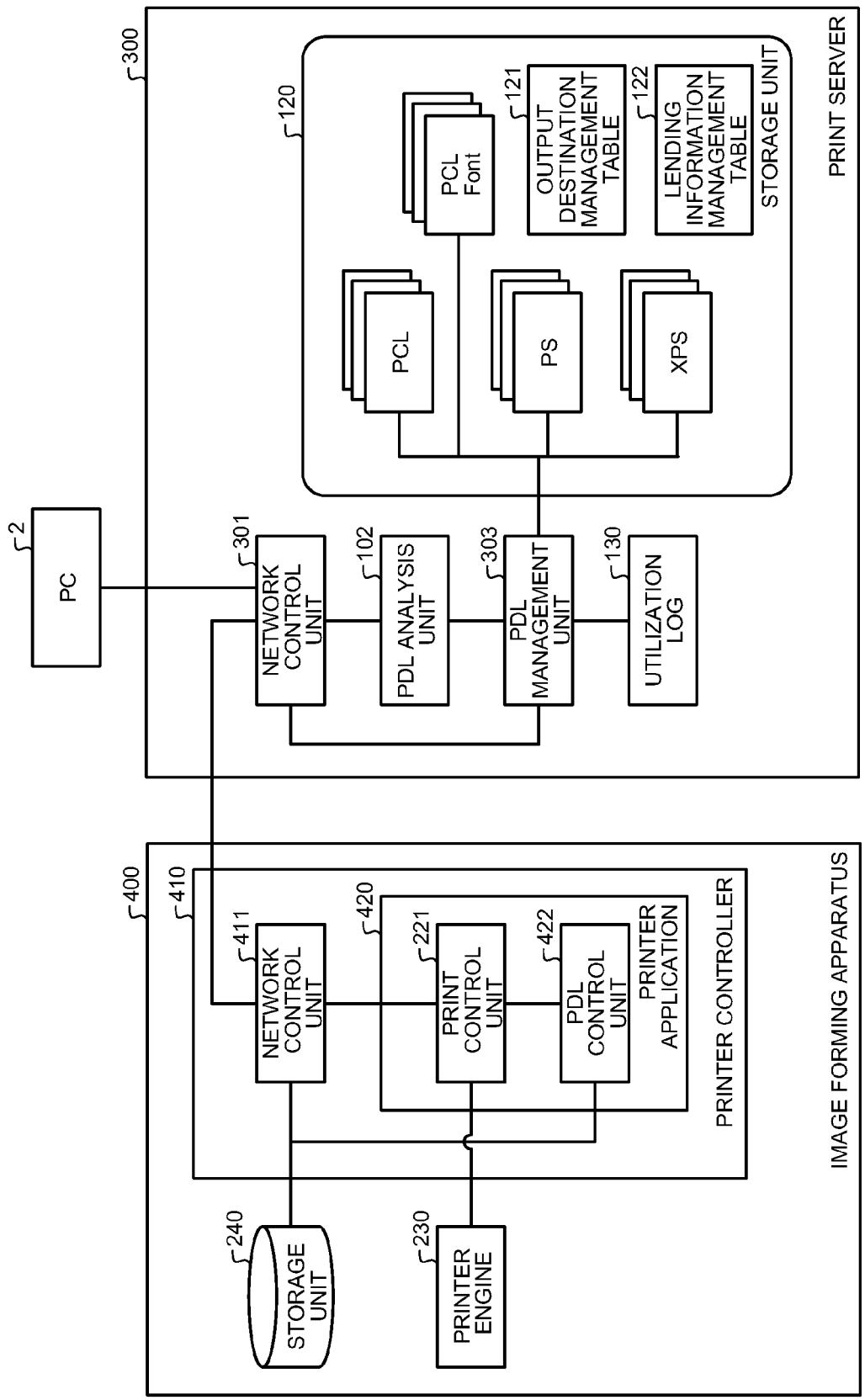
FIG. 8 is a diagram illustrating a configuration of an image forming system according to a second embodiment.

FIG. 8 is a diagram illustrating a configuration of the image forming system according to a second embodiment. As illustrated in FIG. 8, in the image forming system, a PC 2, a print server 300, an image forming apparatus 400 are connected via a network.

The PC 2 is similar to that of the first embodiment, and a description thereof will not be repeated.

The print server 300 receives the print data, determines the type of the PDL corresponding to the print data, and transmits the print data and the PDL executable file to the designated image forming apparatus, and mainly includes a storage unit 120, a utilization log 130, a network control unit 301, a PDL analysis unit 102, and a PDL management unit 303. Configurations and functions of the storage unit 120, the utilization log 130 and the PDL analysis unit 102 are similar to those of the first embodiment, and thus, descriptions thereof will not be repeated.

The network control unit 301 receives, from the PC 2, the designation of the image forming apparatus to perform printing and the print data that the user desires to print. Moreover, if it is determined by the PDL management unit 303 that the PDL required for printing is available, and if the PDL required for the printing is not mounted on the image forming apparatus 400, then the network control unit 301 acquires the PDL executable file required for the printing from the storage unit 120 to transmit the print data and the PDL executable file to the image forming apparatus 400 designated by the user. At this time, the network control unit 301 also transmits the font required for the printing. On the other hand, if it is determined by the PDL management unit 303 that the PDL required for the printing is available but it is determined that the PDL required for the printing is mounted on the image forming apparatus 400, the network control unit 301 does not transmit the PDL executable file, but transmits to the image forming apparatus 400 designated by the user the print data and the PDL deletion unnecessary notice which indicates that the PDL executable file does not need to be deleted.

Moreover, the network control unit 301 receives, from the image forming apparatus 400, the print completion notice which indicates a fact that the printing is completed. Also, the network control unit 301 receives, from the image forming apparatus 400, the PDL deletion notice which indicates that the PDL executable file is deleted.

The PDL management unit 303 manages the PDL executable files stored in the storage unit 120, and determines whether the PDL determined by the PDL analysis unit 102 is available with reference to the PDL executable files stored in the storage unit 120. Furthermore, the PDL management unit 303 determines whether the PDL required for the printing is mounted on the image forming apparatus 400 with reference to the lending information management table 122.

If the PDL management unit 303 determines that the PDL is available, and determines that the PDL required for the printing is not mounted on the image forming apparatus 400, then the PDL management unit 303 lends the PDL executable file to the image forming apparatus 400 from the network control unit 301. Moreover, if it is determined that the PDL is available but it is determined that the PDL required for the printing is mounted on the image forming apparatus 400 with reference to the lending information management table 122, the PDL management unit 303 does not lend the PDL executable file and transmits the PDL deletion unnecessary notice via the network control unit 301. Moreover, if the PDL management unit 303 receives the PDL deletion notice which indicates a fact that the PDL executable file is deleted from the image forming apparatus 400, the PDL management unit 303 updates the lending information management table 122.

Next, the image forming apparatus 400 will be described. The image forming apparatus 400 receives the print data and the PDL executable file, and prints the print data, and mainly includes a storage unit 240, a printer engine 230, and a printer controller 410. In the printer controller 410, a network control unit 411 and a printer application 420 are included, and in the printer application 420, a print control unit 221 and a PDL control unit 422 are included. Here, configurations and functions of the storage unit 240, the printer engine 230 and the print control unit 221 are similar to those of the first embodiment, and thus, descriptions thereof will not be repeated.

The network control unit 411 receives the print data and the PDL executable file from the print server 300, and saves the same in the storage unit 240. At this time, the font required for the printing is also received and saved. Also, the network control unit 411 receives the print data and the PDL deletion unnecessary notice, and saves the print data in the storage unit 240. Moreover, when the printing is completed, the network control unit 411 transmits to the print server 300 the print completion notice which indicates a fact that the printing is completed. Moreover, when the PDL executable file is deleted by the PDL control unit 422, the network control unit 411 transmits to the print server 300 the PDL deletion notice which indicates a fact that the PDL executable file is deleted.

The PDL control unit 422 activates the PDL executable file stored in the storage unit 240 to develop the print data. Moreover, when the PDL control unit 422 receives the PDL deletion unnecessary notice from the network control unit 411, the PDL control unit 422 develops the received print data by the mounted PDL without deleting the PDL executable file. Moreover, after the printing of the print data is completed, the PDL control unit 422 deletes the PDL executable file utilized in the printing by receiving the request of the print control unit 221.

Figure 9:
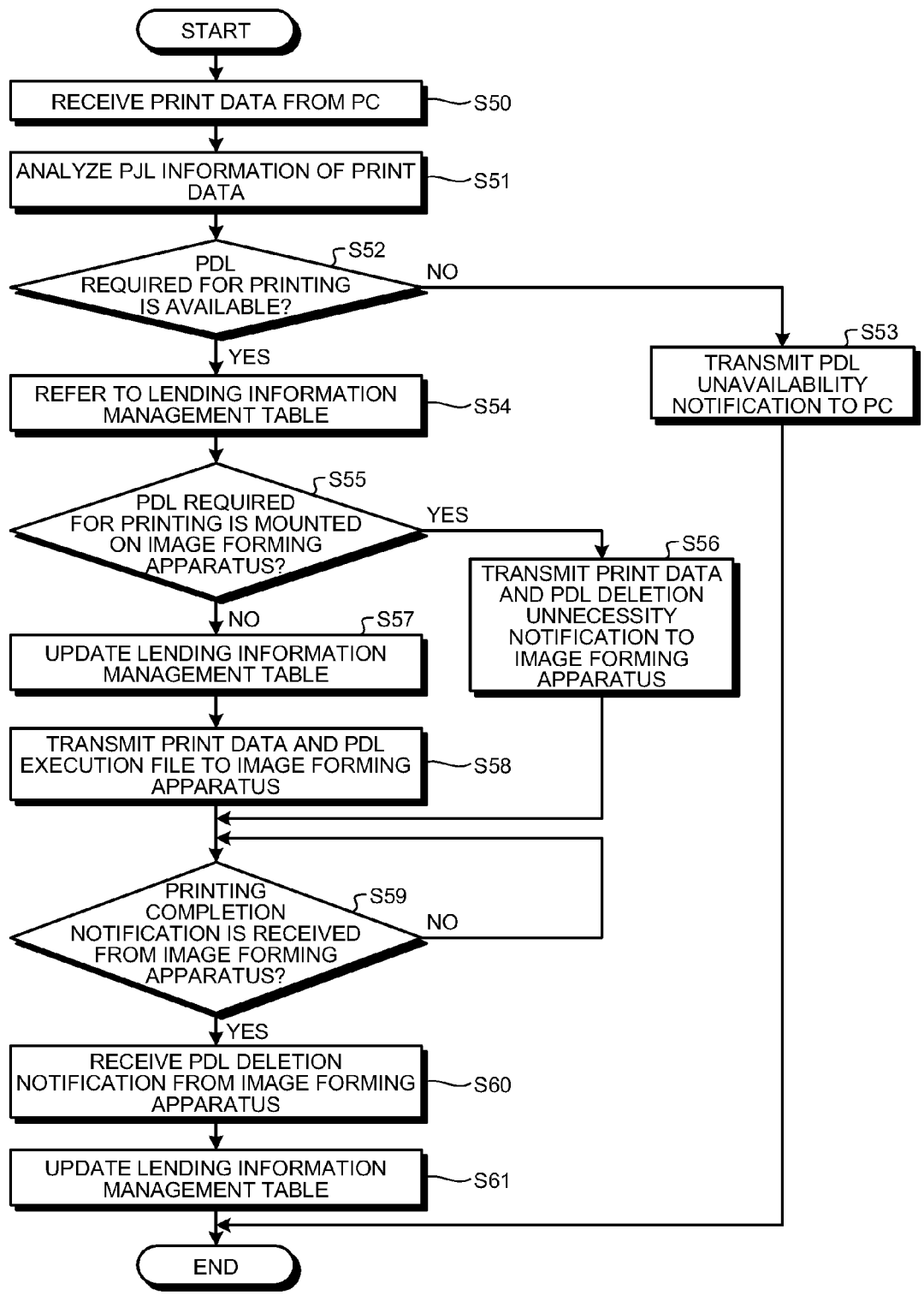
FIG. 9 is a flowchart illustrating a flow of printing processing in a print server according to the second embodiment.

Next, printing processing of the print data in the print server 300 configured as described above will be described. FIG. 9 is a flowchart illustrating a flow of the printing processing in the print server according to the second embodiment.

Processing from the reception of the print data to the transmission of the PDL unavailability notice (steps S50 to S53) is similar to that of the first embodiment (steps S10 to S13).

If the PDL is available (step S52: Yes), the PDL management unit 303 refers to the lending information management table 122 (step S54) and determines whether the PDL required for the printing is mounted on the image forming apparatus 400 (step S55). If the PDL required for the printing is not mounted on the image forming apparatus 400 (step S55: No), the PDL management unit 303 updates the lending information management table 122 (step S57), and the network control unit 301 acquires the PDL executable file required for the printing from the storage unit 120 to transmit the print data and the PDL executable file required for the printing to the image forming apparatus 400 designated by the user (step S58).

On the other hand, if the PDL required for the printing is mounted on the image forming apparatus 400 (step S55: Yes), the PDL management unit 303 does not lend the PDL executable file, and the network control unit 301 transmits the print data and the PDL deletion unnecessary notice to the image forming apparatus 400 (step S56).

Processing of the determination of the reception of the print completion notice and subsequent processing (steps S59 to S61) are similar to those of the first embodiment (steps S16 to S18).

Figure 10:
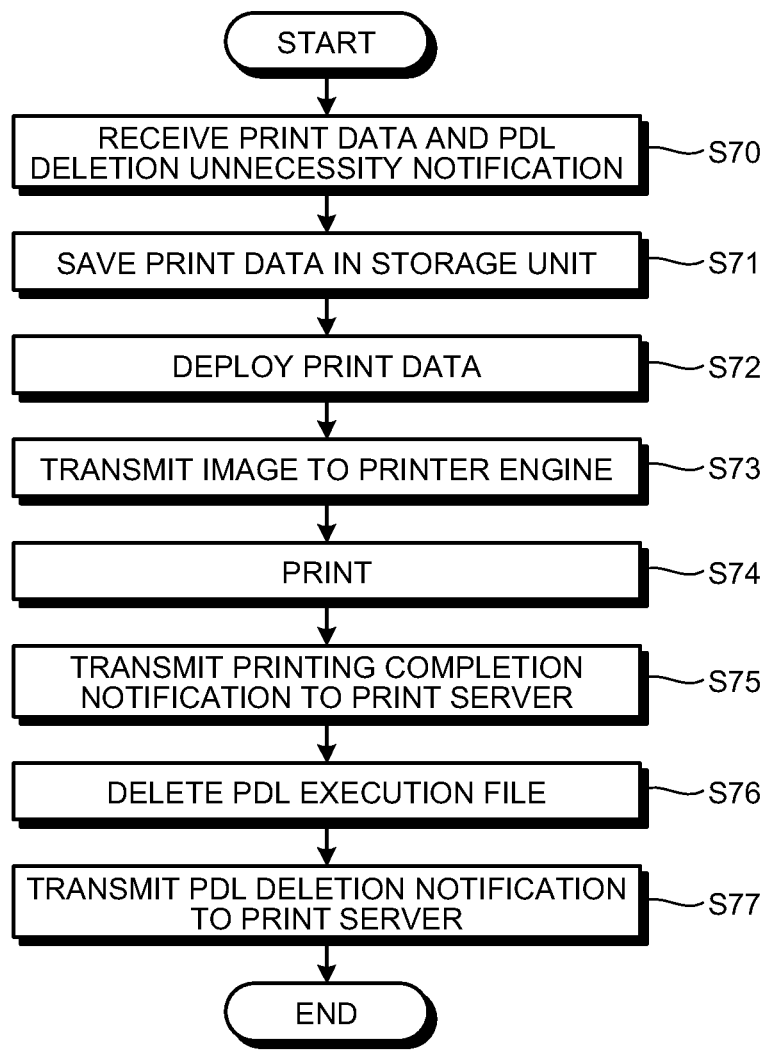
FIG. 10 is a flowchart illustrating a flow of printing processing in an image forming apparatus according to the second embodiment.

Next, printing processing of the print data in the image forming apparatus 400 will be described. FIG. 10 is a flowchart illustrating a flow of the printing processing in the image forming apparatus according to the second embodiment. FIG. 10 illustrates a flow of the printing processing when the print data and the PDL deletion unnecessary notice are transmitted from the print server 300 to the image forming apparatus 400.

First, when the network control unit 411 receives the print data and the PDL deletion unnecessary notice from the print server 300 (step S70), the network control unit 411 saves the received print data in the storage unit 240 (step S71).

The PDL control unit 422 develops the print data by using the mounted PDL (step S72). The print control unit 221 transmits to the printer engine 230 an image developed from the print data (step S73), and the printer engine 230 prints the print data (step S74).

Processing of the transmission of the print completion notice and subsequent processing (steps S75 to 77) are similar to those of the first embodiment (steps S36 to 38).

Moreover, a flow of printing processing when the image forming apparatus 400 receives the print data and the PDL executable file is similar to that of the first embodiment, and thus, a description thereof will not be repeated (refer to FIG. 7).

In this manner, in the image forming system of the second embodiment, the print server analyzes the print data received from the user to determine the type of PDL required for the printing, and transmits the print data and the PDL executable file to the designated image forming apparatus, so that the image forming apparatus performs the printing of the print data. Since the image forming apparatus does not need to store the plurality of types of PDL executable files, the memory usage of the image forming apparatus can be reduced, the time and effort to update the PDLs in the image forming apparatus can be saved, and the user can designate any desired image forming apparatus to be used for the printing.

Furthermore, in the second embodiment, it is determined whether the PDL required for the printing is mounted on the image forming apparatus, and if the PDL is mounted, the print data and the PDL deletion unnecessary notice are transmitted to the image forming apparatus without transmitting the PDL executable file. The image forming apparatus develops the received print data by using the mounted PDL to perform the printing. Thereby, the effort of replacing the PDL and the restart can be saved, thereby enabling the print data to be quickly printed, and printing performance can be further enhanced.

Third Embodiment

In the image forming system of the second embodiment, when the PDL required for the printing is mounted on the image forming apparatus, the print server transmits the print data and the PDL deletion unnecessary notice to the image forming apparatus without transmitting the PDL executable file to print the print data in the image forming apparatus, utilizing the mounted PDL. In contrast, in an image forming system of the present embodiment, when it is determined that the PDL required for the printing is mounted on the image forming apparatus, an inquiry as to whether the PDL is mounted is further made to the image forming apparatus, and if information indicating that the PDL is mounted is received, then the print data and the PDL deletion unnecessary notice are transmitted.

Figure 11:
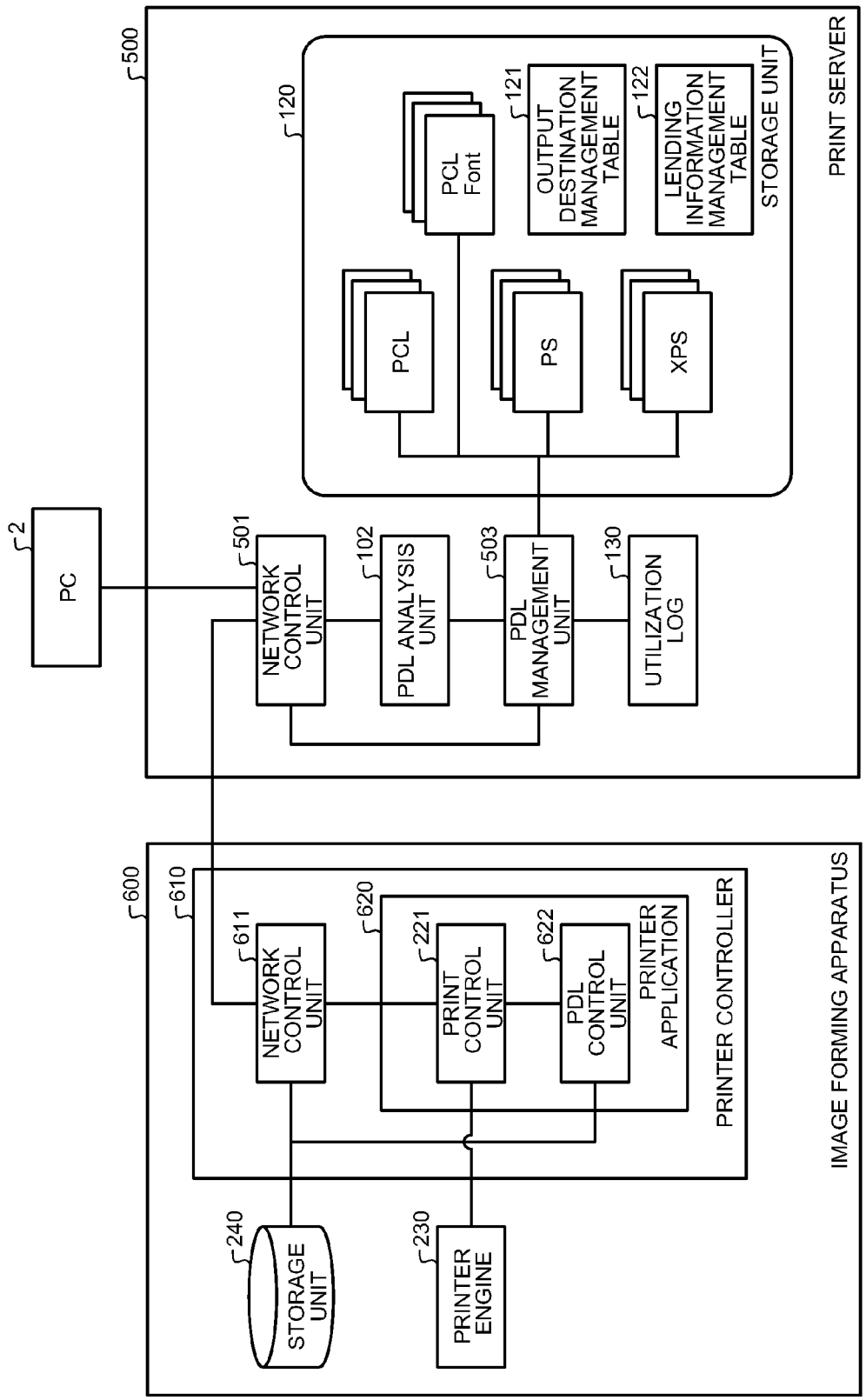
FIG. 11 is a diagram illustrating a configuration of an image forming system according to a third embodiment.

FIG. 11 is a diagram illustrating a configuration of the image forming system according to a third embodiment. As illustrated in FIG. 11, in the image forming system, a PC2, a print server 500, and an image forming apparatus 600 are connected via a network.

The PC 2 is similar to that of the first embodiment, and thus, a description thereof will not be repeated.

The print server 500 receives the print data, determines the type of the PDL compatible with the print data, and transmits the print data and the PDL executable file to the designated image forming apparatus, and mainly includes a storage unit 120, a utilization log 130, a network control unit 501, a PDL analysis unit 102, and a PDL management unit 503. Configurations and functions of the storage unit 120, the utilization log 130 and the PDL analysis unit 102 are similar to those of the first embodiment, and thus, descriptions thereof will not be repeated.

The network control unit 501 receives, from the PC 2, the designation of the image forming apparatus to perform printing and the print data that the user desires to print. Moreover, if it is determined by the PDL management unit 503 that the PDL required for printing is available, and if the PDL required for the printing is mounted on the image forming apparatus 600, then the inquiry as to whether the PDL is mounted is made to the image forming apparatus 600 designated by the user. As a result of the inquiry, the network control unit 501 receives the information indicating whether the PDL is mounted from the image forming apparatus 600.

Moreover, if the network control unit 501 receives the information indicating whether the PDL required for the printing is mounted on the image forming apparatus 600, the network control unit 501 transmits the print data and the PDL deletion unnecessary notice to the image forming apparatus 600 designated by the user without transmitting the PDL executable file. On the other hand, if it is determined that the PDL required for the printing is not mounted on the image forming apparatus 600, and even if it is determined that the PDL required for the printing is mounted on the image forming apparatus 600, when the information indicating that the PDL is not mounted on the image forming apparatus 600 is received, the network control unit 501 acquires the PDL executable file required for the printing from the storage unit 120 to transmit the print data and the PDL executable file to the image forming apparatus 600 designated by the user. At this time, the font required for the printing is also transmitted.

Moreover, the network control unit 501 receives, from the image forming apparatus 600, the print completion notice which indicates a fact that the printing is completed. Also, the network control unit 501 receives, from the image forming apparatus 600, the PDL deletion notice which indicates a fact that the PDL executable file is deleted.

The PDL management unit 503 manages the PDL executable files stored in the storage unit 120, and determines whether the PDL determined by the PDL analysis unit 102 is available with reference to the PDL executable files stored in the storage unit 120. Furthermore, the PDL management unit 503 determines whether the PDL required for the printing is mounted on the image forming apparatus 600 with reference to the lending information management table 122. Moreover, even if it is determined that the PDL required for the printing is mounted on the image forming apparatus 600, the PDL management unit 503 sends to the image forming apparatus 600 an inquiry as to whether the PDL is mounted on it, and determines whether the PDL required for the printing is mounted on the image forming apparatus 600 on the basis of a received result of the inquiry.

If it is determined that the PDL is available, and it is determined that the PDL required for the printing is not mounted on the image forming apparatus 600, the PDL management unit 503 lends the PDL executable file to the image forming apparatus 600 via the network control unit 501. Moreover, even if it is determined that the PDL is available, if it is determined that the PDL required for the printing is mounted on the image forming apparatus 600 with reference to the lending information management table 122 and further, the information indicating that the PDL is mounted is received as the result of the inquiry to the image forming apparatus 600, then the PDL management unit 503 does not lend the PDL executable file and transmits the PDL deletion unnecessary notice via the network control unit 501. Moreover, if the PDL management unit 503 receives the PDL deletion notice which indicates a fact that the PDL executable file is deleted from the image forming apparatus 600, the PDL management unit 503 updates the lending information management table 122.

Next, the image forming apparatus 600 will be described. The image forming apparatus 600 receives the print data and the PDL executable file, and prints the print data, and mainly includes a storage unit 240, a printer engine 230, and a printer controller 610. In the printer controller 610, a network control unit 611 and a printer application 620 are included, and in the printer application 620, a print control unit 221 and a PDL control unit 622 are included. Here, configurations and functions of the storage unit 240, the printer engine 230 and the print control unit 221 are similar to those of the first embodiment, and thus, descriptions thereof will not be repeated.

The network control unit 611 receives the print data and the PDL executable file from the print server 500, and saves the same in the storage unit 240. At this time, the font required for the printing is also received and saved. Also, the network control unit 611 receives the print data and the PDL deletion unnecessary notice, and saves the print data in the storage unit 240. Moreover, the network control unit 611 receives the inquiry as to whether the PDL is mounted from the print server 500 and transmits the determination result of the inquiry by the PDL control unit 622 to the print server 500.

Moreover, when the printing is completed, the network control unit 611 transmits to the print server 500 the print completion notice which indicates a fact that the printing is completed. Moreover, when the PDL executable file is deleted by the PDL control unit 622, the network control unit 611 transmits to the print server 500 the PDL deletion notice which indicates a fact that the PDL executable file is deleted.

The PDL control unit 622 activates the PDL executable file stored in the storage unit 240 to develop the print data. When the PDL control unit 622 receives the inquiry as to whether the PDL is mounted from the print server 500, the PDL control unit 622 searches the storage unit 240 to determine whether the PDL is mounted, and transmits the determination result of the inquiry to the print server 500 via the network control unit 611. Moreover, when the network control unit 611 receives the PDL deletion unnecessary notice, the PDL control unit 622 develops the received print data by using the mounted PDL without deleting the PDL executable file. Moreover, after the printing of the print data is completed, the PDL control unit 622 deletes the PDL executable file utilized in the printing by receiving the request by the print control unit 221.

Figure 12:
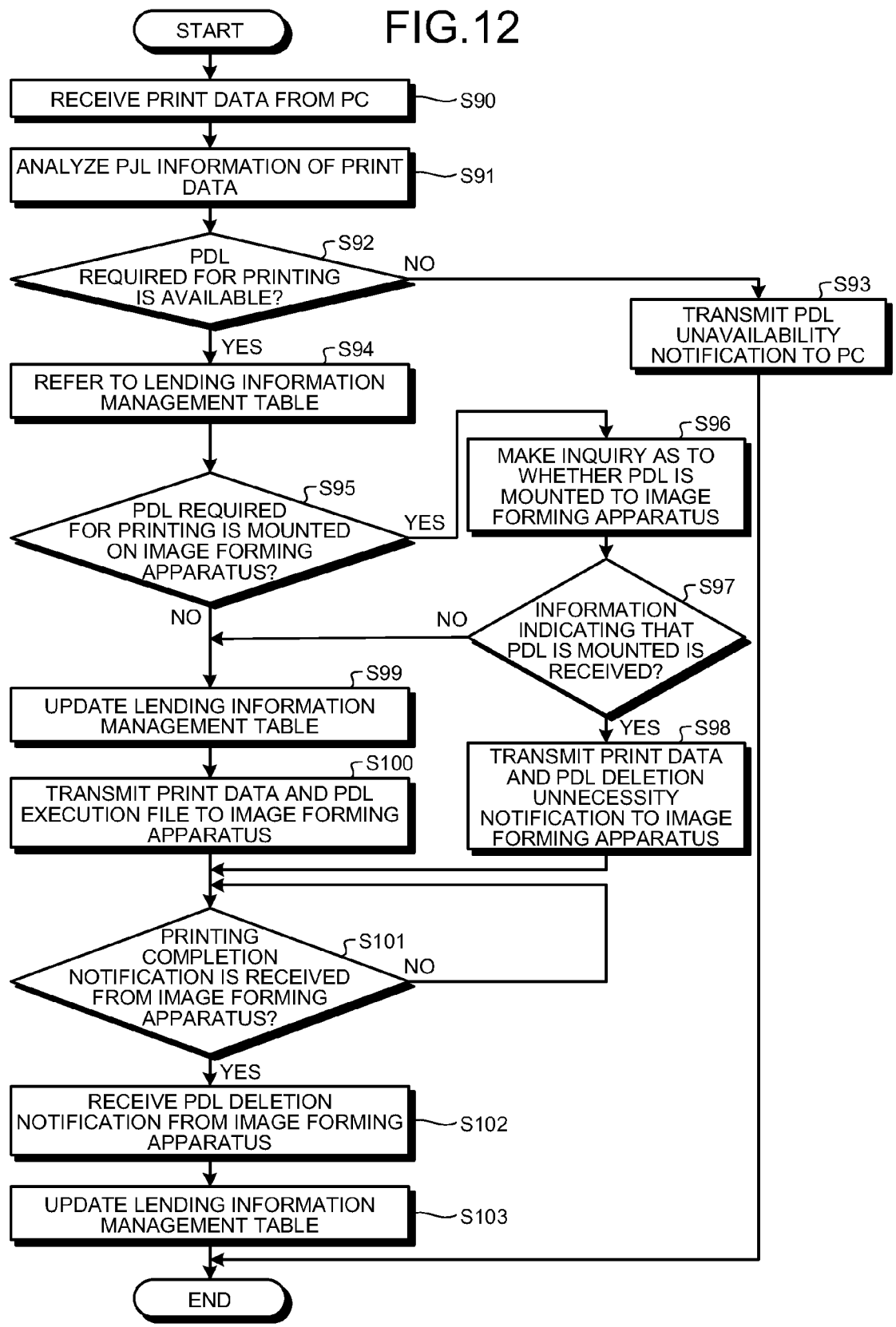
FIG. 12 is a flowchart illustrating a flow of printing processing in a print server according to the third embodiment.

Next, printing processing of the print data in the print server 500 configured as described above will be described. FIG. 12 is a flowchart illustrating a flow of the printing processing in the print server according to the third embodiment.

Processing from the reception of the print data to the transmission of the PDL unavailability notice (steps S90 to S93) is similar to that of the first embodiment (steps S10 to S13).

If the PDL is available (step S92: Yes), the PDL management unit 503 refers to the lending information management table 122 (step S94) and determines whether the PDL required for the printing is mounted on the image forming apparatus 600 (step S95). If the PDL required for the printing is not mounted on the image forming apparatus 600 (step S95: No), the PDL management unit 503 updates the lending information management table 122 (step S99), and the network control unit 501 acquires the PDL executable file required for the printing from the storage unit 120 to transmit the print data and the PDL executable file required for the printing to the image forming apparatus 600 designated by the user (step S100).

On the other hand, if the PDL required for the printing is mounted on the image forming apparatus 600 (step S95: Yes), the network control unit 501 sends to the image forming apparatus 600 the inquiry as to whether the PDL is mounted on it (step S96), and receives the information indicating whether the PDL is mounted. The PDL management unit 503 determines whether the PDL is mounted on the image forming apparatus 600 from the inquiry result (step S97), and if it is determined that the PDL is not mounted (step S97: No), the PDL management unit 503 performs processing in step S99.

On the other hand, if the PDL management unit 503 determines that the PDL is mounted on the image forming apparatus 600, based on the inquiry result (step S97: Yes), the network control unit 501 transmits the print data and the PDL deletion unnecessary notice to the image forming apparatus 600 (step S98).

Processing of the determination of the reception of the print completion notice and subsequent processing (steps S101 to S103) are similar to those of the first embodiment (steps S16 to S18).

Figure 13:
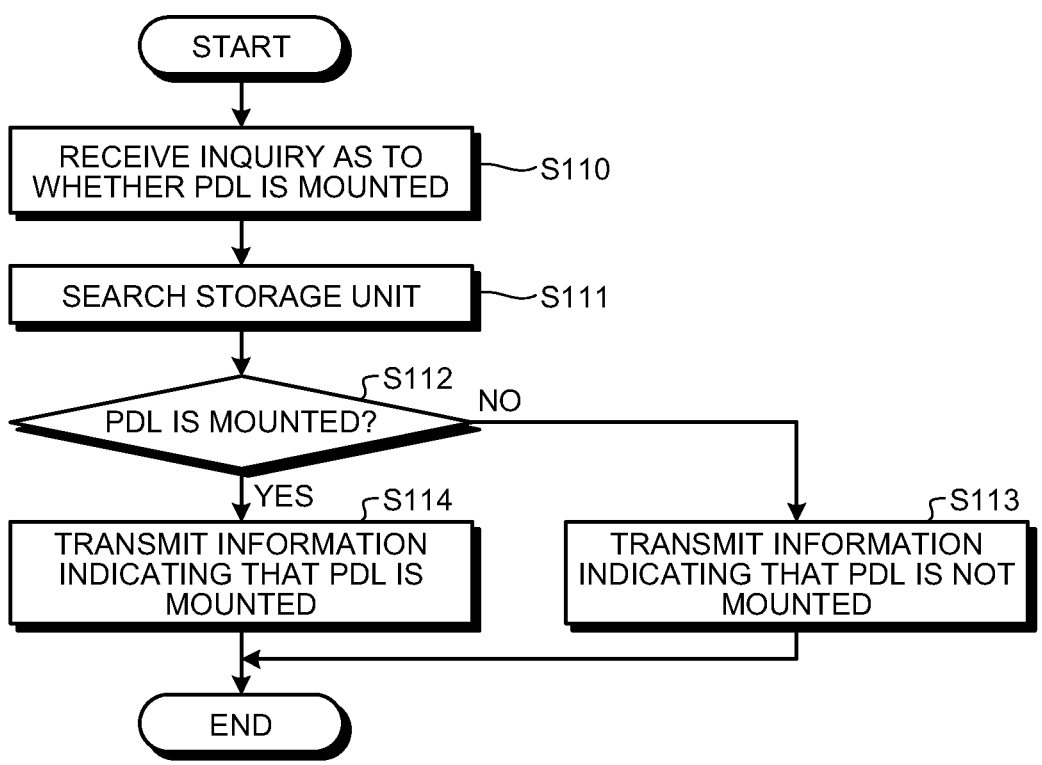
FIG. 13 is a flowchart illustrating a flow of PDL mounting determination processing in an image forming apparatus according to the third embodiment.

Next, PDL mounting determination processing in the image forming apparatus 600 will be described. FIG. 13 is a flowchart illustrating a flow of the PDL mounting determination processing in the image forming apparatus according to the third embodiment.

First, when the network control unit 611 receives the inquiry as to whether the PDL required for the printing is mounted (step S110), the PDL control unit 622 searches the storage unit 240 (step S111) to determine whether the PDL is mounted (step S112). If it is determined by the PDL control unit 622 that the PDL required for the printing is not mounted (step S112: No), the network control unit 611 transmits the information indicating that the PDL is not mounted to the print server 500 (step S113). On the other hand, if it is determined by the PDL control unit 622 that the PDL required for the printing is mounted (step S112: Yes), the network control unit 611 transmits the information indicating that the PDL is mounted to the print server 500 (step S114).

A flow of printing processing by the image forming apparatus 600 is similar to those in the first and second embodiments, and thus, a description thereof will not be repeated (refer to FIGS. 7, 10).

In this manner, in the image forming system of the third embodiment, the print server analyzes the print data received from the user to determine the type of PDL required for the printing, and transmits the print data and the PDL executable file to the designated image forming apparatus, so that the image forming apparatus performs the printing of the print data. Since the image forming apparatus does not need to store the plurality of types of PDL executable files, the memory usage of the image forming apparatus can be reduced, the time and effort to update the PDLs in the image forming apparatus can be saved, and the user can designate any desired image forming apparatus to be used for the printing.

Furthermore, in the third embodiment, even if it is determined on the print server side that the PDL required for the printing is mounted on the image forming apparatus, the inquiry as to whether the PDL is mounted is sent to the image forming apparatus, which can prevent erroneous determination or the like when an actual usage situation of the PDL in the image forming apparatus is different from that in the lending information management table 122 due to power-off of the image forming apparatus before the PDL deletion notice is transmitted or the like. This can save the trouble to replace the PDL in the image forming apparatus and restart the image forming apparatus, based on the precise determination as to whether the PDL is mounted, thereby enabling the print data to be quickly printed, so that the printing performance can be further enhanced.

Fourth Embodiment

In the image forming system of the first embodiment, when the PDL required for the printing is available in the print server, the print server transmits the print data and the PDL executable file to the image forming apparatus to print the print data in the image forming apparatus. In contrast, in the image forming system of the present embodiment, the number of the lendable PDL executable files is managed in the print server, and when the PDL required for the printing is available, and the lendable PDL executable file is left, the print data and the PDL executable file are transmitted to the image forming apparatus to perform the printing.

Figure 14:
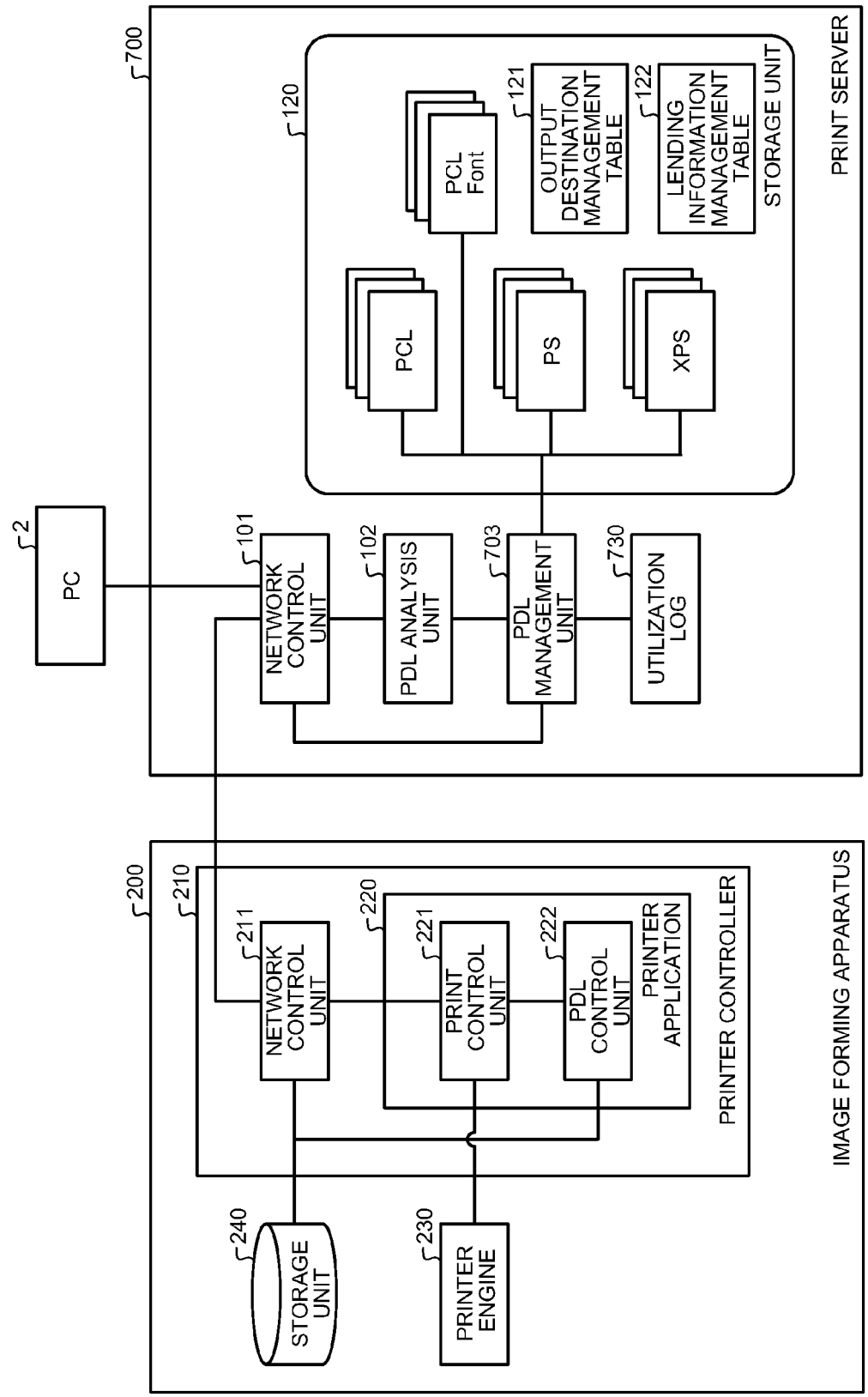
FIG. 14 is a diagram illustrating a configuration of an image forming system according to a fourth embodiment.

FIG. 14 is a diagram illustrating a configuration of the image forming system according to a fourth embodiment. As illustrated in FIG. 14, in the image forming system, a PC 2, a print server 700, and an image forming apparatus 200 are connected via a network.

Here, the PC 2 and the image forming apparatus 200 are similar to those of the first embodiment, and thus, descriptions thereof will not be repeated.

The print server 700 receives the print data, determines the type of the PDL corresponding to the print data, and transmits the print data and the PDL executable file to the designated image forming apparatus, and mainly includes a storage unit 120, a utilization log 730, a network control unit 101, a PDL analysis unit 102, and a PDL management unit 703. Configurations and functions of the storage unit 120, the network control unit 101, and the PDL analysis unit 102 are similar to those of the first embodiment, and thus, descriptions thereof will not be repeated.

The utilization log 730 is a log of a utilization situation of the PDL and is updated by the PDL management unit 703. Moreover, the utilization log 730 stores a holding number, which is a number of the PDL executable files lendable to the image forming apparatus 200, and a usage number, which is a number of the PDL executable files lent to the image forming apparatus 200.

FIG. 15 is a diagram illustrating one example of the utilization log. As illustrated in FIG. 15, in the utilization log 730, the type of the PDL such as "PCL", the model name of the image forming apparatus "AAA", version information such as "1.50", the font such as "pc11.00", the holding number such as "10", and the usage number such as "5" are recorded.

The PDL management unit 703 manages the PDL executable files stored in the storage unit 120, and determines whether the PDL determined by the PDL analysis unit 102 is available with reference to the PDL executable files stored in the storage unit 120. Furthermore, when the PDL management unit 703 determines that the PDL is available, the PDL management unit 703 determines whether the PDL executable file is lendable with reference to the holding number and the usage number of the utilization log.

If the PDL management unit 703 determines that the PDL is available, and further determines that the PDL executable file required for the printing is lendable, then the PDL management unit 703 lends the PDL executable file to the image forming apparatus 200. Moreover, if the PDL management unit 703 determines that the PDL executable file required for the printing is not lendable, the PDL management unit 703 stands by until the PDL executable file becomes lendable. Moreover, if the PDL management unit 703 receives the PDL deletion notice which indicates a fact that the PDL executable file is deleted from the image forming apparatus 200, the PDL management unit 703 updates the lending information management table 122.

Figure 16:
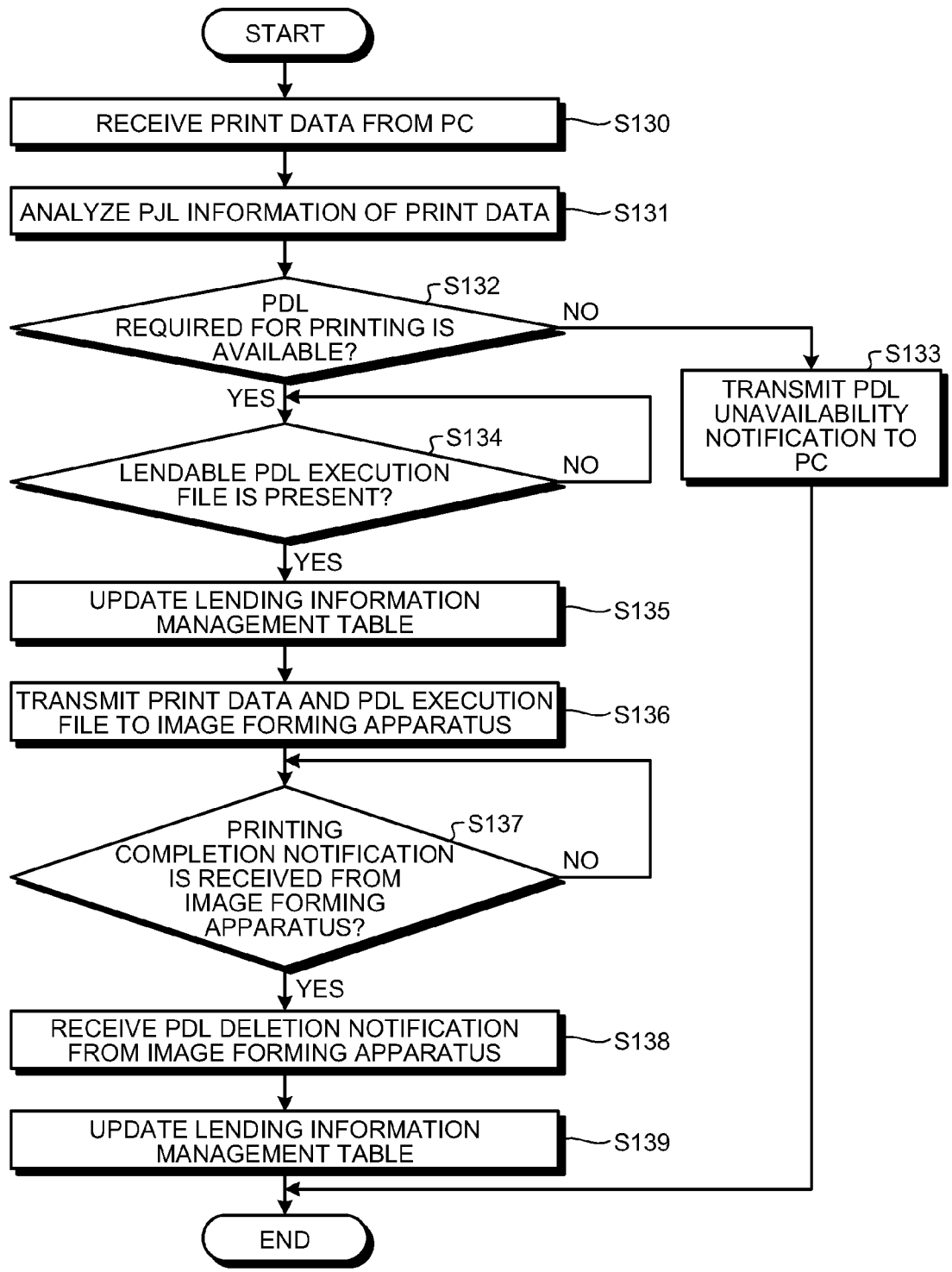
FIG. 16 is a flowchart illustrating a flow of printing processing in a print server according to the fourth embodiment.

Next, printing processing of the print data in the print server 700 configured as described above will be described. FIG. 16 is a flowchart illustrating a flow of the printing processing in the print server according to the fourth embodiment.

Processing from the reception of the print data to the transmission of the PDL unavailability notice (steps S130 to S133) is similar to that of the first embodiment (steps S10 to S13).

If the PDL is available (step S132: Yes), the PDL management unit 703 determines whether the lendable PDL executable file is present with reference to the holding number and the usage number of the utilization log 730 (step S134). If the lendable PDL executable file is absent (step S134: No), the PDL management unit 703 stands by until the PDL executable file becomes lendable. On the other hand, if the lendable PDL file is present (step S134: Yes), the PDL management unit 703 updates the lending information management table 122 (step S135), and the network control unit 101 acquires the PDL executable file required for the printing from the storage unit 120 to transmit the print data and the PDL executable file required for the printing to the image forming apparatus 200 designated by the user (step S136).

Processing of the determination of the reception of the print completion notice and subsequent processing (steps S137 to S139) are similar to those of the first embodiment (steps S16 to S18).

A flow of printing processing when the image forming apparatus 200 receives the print data and the PDL executable file is similar to that of the first embodiment, and thus, a description thereof will not be repeated (refer to FIG. 7).

In this manner, in the image forming system of the fourth embodiment, the print server analyzes the print data received from the user to determine the type of PDL required for the printing, and transmits the print data and the PDL executable file to the designated image forming apparatus, so that the image forming apparatus performs the printing of the print data. Since the image forming apparatus does not need to store the plurality of types of PDL executable files, the memory usage of the image forming apparatus can be reduced, the time and effort to update the PDLs in the image forming apparatus can be saved, and the user can designate any desired image forming apparatus to be used for the printing.

Furthermore, in the fourth embodiment, the printer server manages the number of the lendable PDL executable files. And, the print server sends the print data and the PDL executable file to the image forming apparatus, when there is/are any PDL executable file(s) which is required for the printing and which can be lent. Then, the image forming apparatus performs the printing by using the received print data and the received PDL executable file. Thus, it is possible to realize a license management by limiting the number of the PDL executable file(s) kept by the image forming apparatus. For example, it is possible to collect a license fee in response to the type(s) of PDL(s) or the number of PDL executable file(s) which is/are kept by the image forming apparatus. Furthermore, the smaller the number or type variations of the PDL(s) mounted on the image forming apparatus, the smaller the memory usage.

While in the fourth embodiment, the processing of managing the number of the lendable PDL executable files in the print server to perform the printing is added to the first embodiment, the processing may be added to the second embodiment or the third embodiment.

Figure 17:
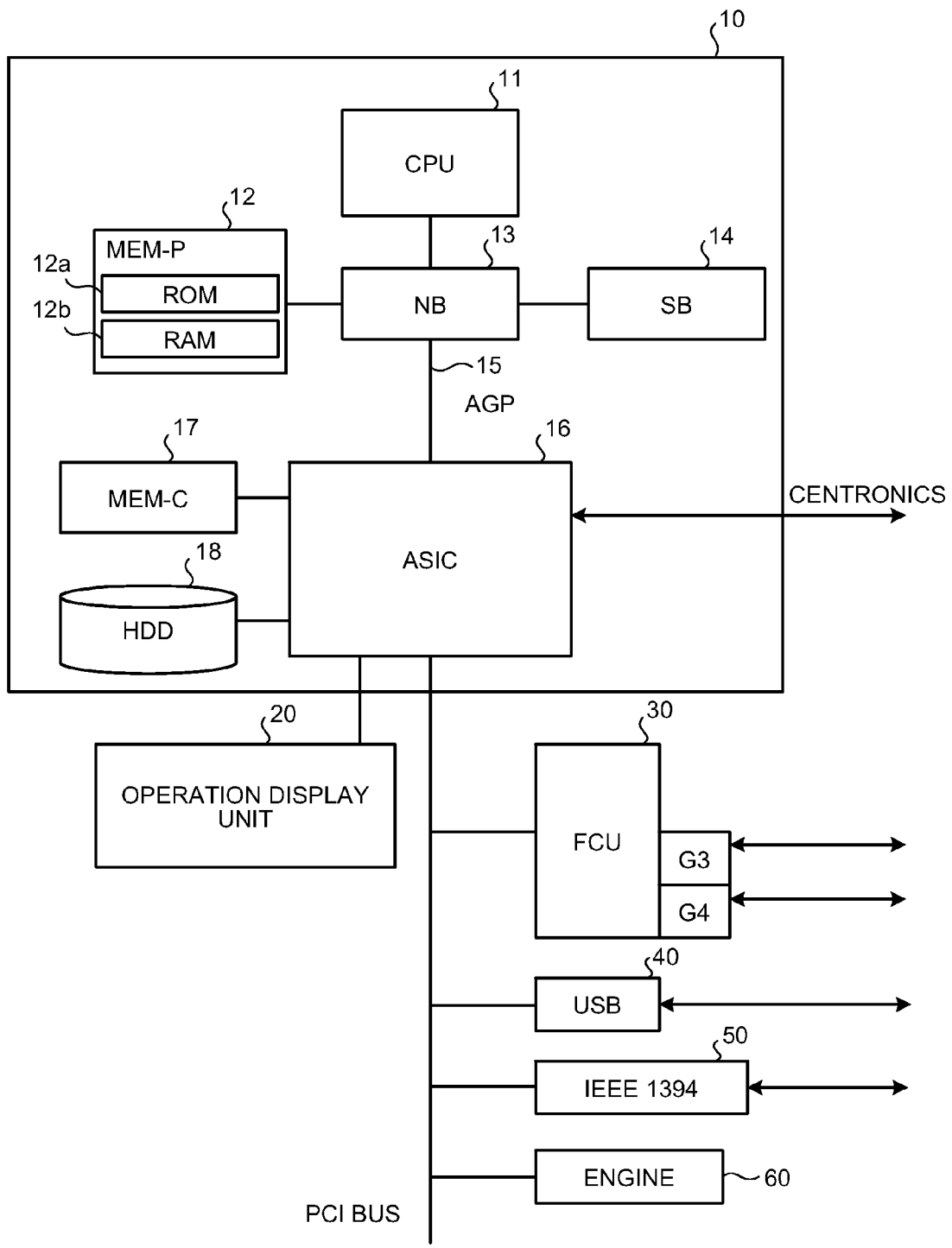
FIG. 17 is a block diagram illustrating a hardware configuration of the image forming apparatus according to each of the first to fourth embodiments.

FIG. 17 is a block diagram illustrating a hardware configuration of the image forming apparatus according to each of the first to fourth embodiments. As illustrated in the present figure, these image forming apparatuses 200, 400, 600 each have a configuration in which a controller 10 and an engine unit (Engine) 60 are connected by a PCI (Peripheral Component Interface) bus. The controller 10 is a controller that controls the whole of each of the image forming apparatuses 200, 400, 600 and drawing, communication, and input from an operating unit not illustrated. The engine unit 60 is a printer engine or the like connectable to the PCI bus, and is, for example, a monochrome plotter, a one-drum color plotter, a four-drum color plotter, a scanner, a facsimile unit or the like. This engine unit 60 includes a part of an image processing such as error diffusion and gamma conversion in addition to a so-called engine part such as the plotter.

The controller 10 has a CPU 11, a north bridge (NB) 13, a system memory (MEM-P) 12, a south bridge (SB) 14, a local memory (MEM-C) 17, an ASIC (Application Specific Integrated Circuit) 16, and a hard disk drive (HDD) 18, and has a configuration in which the north bridge (NB) 13 and the ASIC 16 are connected by an AGP (Accelerated Graphics Port) bus 15. Moreover, the MEM-P 12 further has a ROM (Read Only Memory) 12a, a RAM (Random Access Memory) 12b.

The CPU 11 performs the control of the whole of each of the image forming apparatuses 200, 400, 600, has a chipset made up of the NB 13, the MEM-P 12 and the SB 14 to be connected to other devices via this chipset.

The NB 13 is a bridge to connect the CPU 11 to the MEM-P 12, the SB 14, and an AGP 15, and has a memory controller that controls reading and writing with respect to the MEM-P 12, and a PCI master and an AGP target.

The MEM-P 12 is a system memory used as a memory for storing a program and data, a memory for developing a program and data, a memory for drawing of the printer, and the like, and is made up of the ROM 12a and the RAM 12b. The ROM 12a is a read only memory used as the memory for storing the program and the data, and the RAM 12b is a writable and readable memory used as the memory for developing the program and the data, the memory for drawing of the printer, and the like.

The SB 14 is a bridge to connect the NB 13, and a PCI device and a peripheral device. This SB 14 is connected to the NB 13 via the PCI bus, and to this PCI bus is also connected a network interface (I/F) unit and the like.

The ASIC 16 is an IC (Integrated Circuit) for image processing application having a hardware element for image processing, and has a role of bridge connecting each of the AGP 15, the PCI bus, the HDD 18 and the MEM-C 17. This ASIC 16 is made up of the PCI target and the AGP master, an arbiter (ARB) serving as a core of the ASIC 16, a memory controller that controls the MEM-C 17, a plurality of DMACs (Direct Memory Access Controllers) that perform rotation of image data and the like by hardware logic or the like, a PCI unit that performs data forwarding via the PCI bus with respect to the engine unit 60. To this ASIC 16 are connected an FCU (Facsimile Control Unit) 30, a USB (Universal Serial Bus) 40, and an IEEE 1394 (the Institute of Electrical and Electronics Engineers 1394) interface 50. An operation display unit 20 is directly connected to the ASIC 16.

The MEM-C 17 is a local memory used as an image buffer and a code buffer for copy, and the HDD (Hard Disk Drive) 18 is a storage to perform accumulation of image data, accumulation of the programs, accumulation of font data, and accumulation of forms.

The AGP 15 is a bus interface for a graphics accelerator card proposed to speed up graphic processing, and directly accessing the MEM-P 12 with a high throughput speeds up the graphics accelerator card.

An output management program executed in each of the print servers 100, 300, 500, 700 of the present embodiments is incorporated in the ROM or the like in advance to be provided. The output management program executed in each of the print servers 100, 300, 500, 700 of the present embodiments may be configured so as to be recorded and provided on a computer-readable recording medium such as a CD-ROM, a flexible disk (FD), a CD-R, and a DVD (Digital Versatile Disk) in a file of an installable format or an executable format.

Furthermore, the output management program executed in each of the print servers 100, 300, 500, 700 in the present embodiments may be configured so as to be stored on a computer connected to the network such as the Internet, and be downloaded and provided via the network. Moreover, the output management program executed in each of the print servers 100, 300, 500, 700 of the present embodiments may be provided or distributed via the network such as the Internet.

The output management program executed in each of the print servers 100, 300, 500, 700 of the present embodiments has a module configuration including the above-described units (the network control unit, the PDL analysis unit, the PDL management unit), and as actual hardware, the CPU (processor) reads the output management program from the above-mentioned ROM to execute the same, by which the above-mentioned units are loaded onto a main storage apparatuses, so that the network control unit, the PDL analysis unit, and the PDL management unit are generated on the main storage apparatus.

According to the present invention, the type of the page description language is determined by the output managing server, and the output data and the executable file of the page description language are transmitted and output to the image forming apparatus designated by the user, which brings about effects that the image forming apparatus need not store a plurality of types of page description languages, so that the memory usage of the image forming apparatus can be suppressed, the time and trouble to update the page description languages in the image forming apparatus can be saved, and the user can designate the image forming apparatus desired to perform the printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming system comprising:
an image forming apparatus; and
an output management server connected with the image forming apparatus via a network, wherein
the output management server includes
a storage wilt configured to store a plurality of types of executable files for developing an output data,
a first receiving unit configured to receive the output data including information indicating a type of PDL (Page Description Language) in the output data, from an information processing device connected with the output management server,
an acquiring unit configured to acquire the executable files for developing the output data received by the first receiving unit from the storage unit on a basis of the type of PDL included in the output data received by the first receiving unit, and
a first transmitting unit configured to transmit the output data and the executable files acquired by the acquiring unit to the image forming apparatus,
wherein the image forming apparatus includes
a second receiving unit configured to receive the output data and the executable files,
a control unit configured to develop the output data received by the second receiving unit by using the executable files received by the second receiving unit,
an output unit configured to output the output data developed by the control unit, and
a deleting unit configured to delete the executable files, after the outputting of the output data is completed.

2. The image forming system according to claim 1, wherein the storage unit is further configured to store an output destination information in which a unique identification information of the image forming apparatus is associated with a machine information of the forming apparatus, and
wherein the output management system further includes an analysis unit configured to determine the type of PDL required for outputting the output data on the basis of the output data and the output destination information.

3. The image forming system according to claim 2, wherein the storage unit is further configured to store a lending information in which the unique identification information is associated with a lending situation which indicates whether the type of PDL is loaded onto the image forming apparatus,
the first transmitting unit is configured to transmit to the image forming apparatus designated by the user the output data and a deletion unnecessary notice which indicates that the executable files required for outputting the output data is not need to be deleted, when the management unit determines that the type of PDL required for outputting the output data is loaded onto the image forming apparatus,
the second receiving unit is configured to receive the output data and the deletion unnecessary notice, and
the control unit is configured to develop the output data on the basis of the type of PDL loaded onto the image forming apparatus.

4. The image forming system according to claim 3, wherein the image forming apparatus further includes
a second transmitting unit configured to transmit to the output management server a deletion notice which indicates that the executable files are deleted, and
the first receiving unit is configured to receive the deletion notice.

5. The image forming system according to claim 4, wherein the first transmitting unit is configured to transmit an inquiry to the image forming apparatus designated by the user whether the type of PDL is loaded onto the image forming apparatus designated by the user,
the first receiving unit is configured to receive an inquiry result from the image forming apparatus designated by the user,
the first transmitting unit is configured to transmit the deletion unnecessary notice and the output data to the image forming apparatus designated by the user,
the first transmitting unit is configured to transmit the deletion unnecessary notice and the output data to the image forming apparatus designated by the user, when the inquiry result indicates that the type of PDL required for outputting the output data is loaded onto the image forming apparatus designated by the user, and is configured to transmit the output data and the executable files required for outputting the output data are loaded onto the image forming apparatus designated by the user, when the inquiry result indicates that the type of PDL required for outputting the output data is not loaded onto the image forming apparatus designated by the user,
the second receiving unit is configured to receive the inquiry,
the control unit is configured to determine whether the type of PDL required for outputting the output data is loaded onto the image forming apparatus designated by the user, and
the second transmitting unit is configured to transmit the inquiry result determined by the control unit to the output management server.

6. The image forming system according to claim 4, the output management server further includes an utilization log to store, on the basis of the lending information, the number of the executable files which can be lent to the image forming apparatus, and the number of the executable files which are lent to the image forming apparatus, a management unit configured to determine whether the type of PDL is available, wherein the management unit is further configured to determine whether the executable files required for outputting the output data can be lent, with reference to the utilization log, and wherein the first transmitting unit is configured to transmit the executable files to the image forming apparatus, when the management unit determines that the type of PDL required for outputting the output data is available and determines that the executable files required for outputting the data can be lent.

7. An output management method conducted by an image forming system composed of an image forming apparatus and an output server connected with the image forming apparatus via a network, the method comprising:

storing a plurality of types of executable files for developing an output data in a storage unit;

receiving an output data including information indicating a type of PDL (Page Description Language) in the output data, from an information processing device connected with the output server;

acquiring the executable files for developing the output data on the basis of the type of PDL included in the output data; and transmitting the output data and executable files to the image forming apparatus, when it is determined that the type of PDL required for outputting the data is available, developing the transmitted output data by using the transmitted executable files, outputting the developed output data, and deleting the executable files after the outputting of the developed output data is completed.

8. A computer program product comprising a non-transitory computer-readable medium having computer-readable program codes embedded therein for conducting an output management by an image forming system composed of an image forming apparatus and an output server connected with the image forming apparatus via a network, the program codes when executed causing a computer to execute:

storing a plurality of types of executable files for developing an output data in a storage unit;

receiving an output data including information indicating a type of PDL (Page Description Language) in the output data, from an information processing device connected with the output server;

acquiring the executable files for developing the output data on the basis of the type of PDL included in the out data; and transmitting the output data and executable files to the image forming apparatus, when it is determined that the type of PDL required for outputting the data is available, developing the transmitted output data by using the transmitted executable files, outputting the developed output data, and deleting the executable files after the outputting of the developed output data is completed.

* * * * *